(12) United States Patent
Neyt et al.

(10) Patent No.: US 7,611,638 B2
(45) Date of Patent: Nov. 3, 2009

(54) METHOD OF PURIFYING POLLUTED WATER

(75) Inventors: Alain Neyt, Wetteren (BE); Luc Wouters, Schilde (BE)

(73) Assignee: Recticel, Brussels (BE)

( * ) Notice: Subject to any disclaimer, the term of this patent is extended or adjusted under 35 U.S.C. 154(b) by 165 days.

(21) Appl. No.: 11/571,318

(22) PCT Filed: Jun. 28, 2005

(86) PCT No.: PCT/EP2005/053044
§ 371 (c)(1),
(2), (4) Date: Dec. 27, 2006

(87) PCT Pub. No.: WO2006/000591
PCT Pub. Date: Jan. 5, 2006

(65) Prior Publication Data
US 2008/0067136 A1    Mar. 20, 2008

(30) Foreign Application Priority Data
Jun. 28, 2004 (EP) .................................. 04447152

(51) Int. Cl.
*C02F 1/78* (2006.01)
*C02F 1/68* (2006.01)
*A61L 2/00* (2006.01)
*B01J 19/12* (2006.01)

(52) U.S. Cl. .................. 210/760; 210/752; 210/761; 210/764; 422/28; 422/186.07; 422/186.08

(58) Field of Classification Search ............... 210/760, 210/752, 761, 764; 422/28, 186.07, 186.08
See application file for complete search history.

(56) References Cited

U.S. PATENT DOCUMENTS

2002/0148790 A1    10/2002    Krulik (Continued)

FOREIGN PATENT DOCUMENTS

JP    55059897 A1    5/1980

(Continued)

OTHER PUBLICATIONS

Walter Den et al., "Treatment of Organic Wastewater Discharged From Semiconductor Manufacturing Process by Ultraviolet/Hydrogen Peroxide and Biodegradation", IEEE Transactions on Semiconductor Manufacturing, vol. 15, No. 4, pp. 540-551 (Nov. 2002).*

(Continued)

*Primary Examiner*—Duane Smith
*Assistant Examiner*—Paul J Durand
(74) *Attorney, Agent, or Firm*—Sughrue Mion, PLLC

(57) ABSTRACT

In a first treatment step part of at least one difficulty biodegradable or non-biodegradable organic compound is oxidized in polluted water by bringing said polluted water into contact with an ozone containing gas. The effluent is subsequently diluted with an aqueous liquid before a second treatment with ozone is carried out. If the concentration of the organic compound is still not sufficiently low, the treated effluent is diluted again and subjected to a further treatment with ozone. It was found that a more effective ozone treatment was obtained by the dilution or dilutions and that in particular no pH control was needed, so that no formation of additional salts occurred.

25 Claims, 2 Drawing Sheets

U.S. PATENT DOCUMENTS

2003/0106855 A1* 6/2003 Kin et al. .................. 210/748

FOREIGN PATENT DOCUMENTS

WO        01/74471 A1    10/2001

OTHER PUBLICATIONS

Karel Stopka, "Experiences During 25 Years of Ozonation For Different Industrial Applications", Proceedings of the Annual PAG Conference, pp. 230-231, 1997, Presented at IOA/PAG Conference, Lake Tahoe, Nevada, Aug. 18, 1997.*

Patent Abstracts of Japan, vol. 0040, No. 98 (C-018), Jul. 15, 1980.

Masten, S. J. et al; "The Use of Ozonation to Degrate Organic Contaminants in Wastewaters Advances in Water Treatment Technologies", Environmental Science and Technology, American Chemical Society, Easton, PA US, vol. 28, No. 4, Apr. 1, 1994, pp. 180A-185A.

Camel V. et al, "The Use of Ozone and Associated Oxidation Processes in Drinking Water Treatment", Water Research, Elsevier Science Publishers, Amsterdam, NL, vol. 32, No. 11, Nov. 1, 1998, pp. 3208-3222.

* cited by examiner

METHOD OF PURIFYING POLLUTED WATER

I. PROBLEM TO BE SOLVED

It is virtually impossible to purify heavily polluted industrial effluent, charged with a combination of organic chemical pollutants, completely to recyclable water by means of the existing techniques. Particular examples in this case are effluents with high to very high COD, TOC, MAH, VOCl and HCN values, occurring alone or in combinations. The object of the invention is to offer a new method which permits a complete purification of the effluent without the need of adding any additional salt load to the water.

II. SPECIFIC COMPONENTS OF THE SYSTEM

In the system described hereinafter, ozone is either produced starting from purified and strongly dried air (dew point <−65° C.) or starting from oxygen (i.e. an oxygen rich gas) with a concentration of 80-99 wt. %. In the following description, when reference is made to air, such an air quality is meant whilst when reference is made to oxygen, such an oxygen quality is meant.

Figure 1:
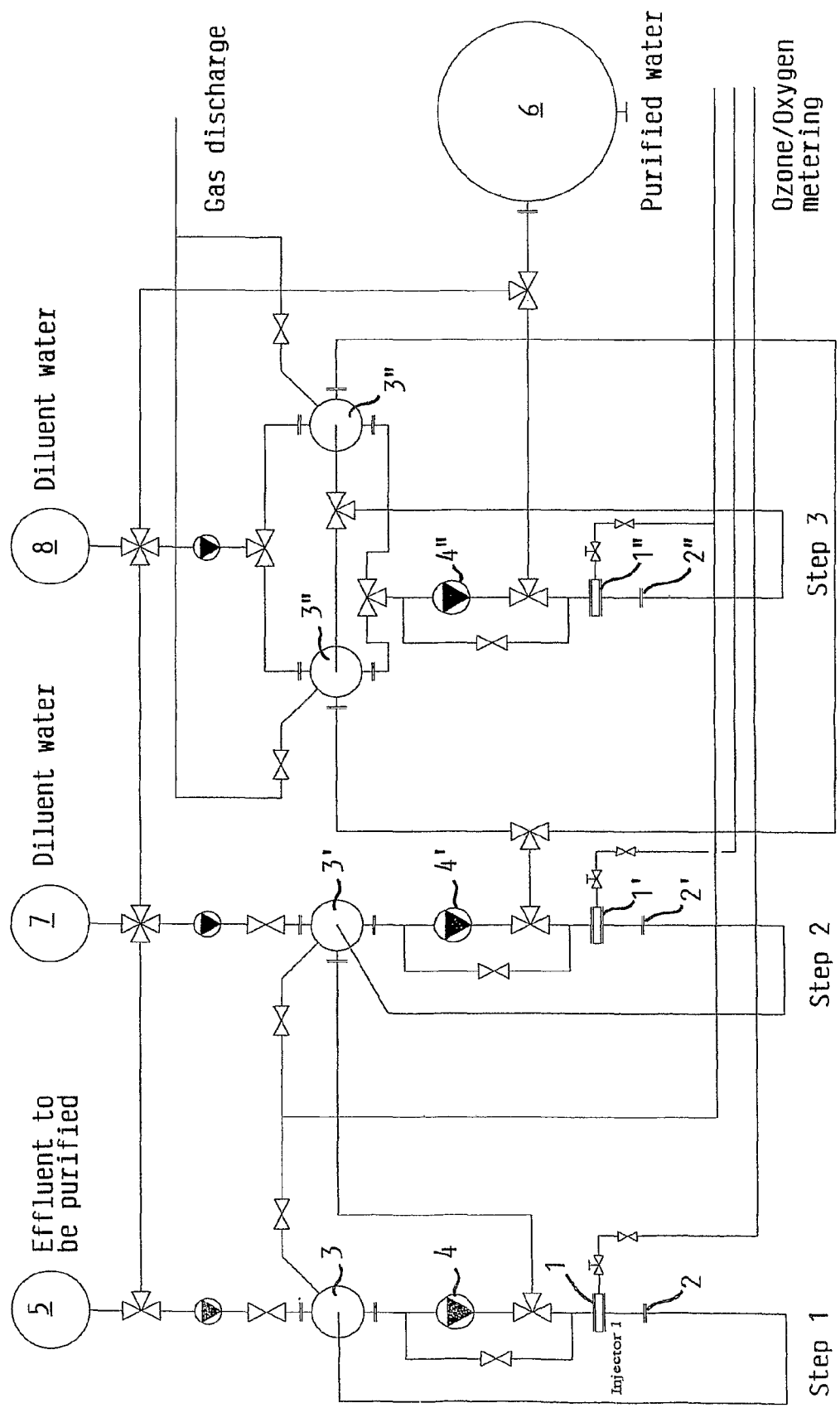
FIG. 1 shows a possible arrangement of components in the system used in the present invention.

In order to obtain a good, fast and complete reaction with ozone, a number of specific components must be present. FIG. 1 shows, by way of example, a possible arrangement in which these components are present, more specifically the following components:

1. The Ozone Injector (1):

The gas injector ensures a uniform distribution of fine gas bubbles in the water flow. Thanks to the maximum contact surface with the water, the finely divided gas bubbles can dissolve the gas quickly in the water. Only in the dissolved state, ozone, obtained from air or oxygen, can react with the harmful constituents of the water. The injector consists of a gas filled ring, along the inside of which a number of distributors are fitted, so that the ozone rich gas mixture is uniformly distributed over the entire water section. The size of the holes in the spray heads and the number of distributors depend on the gas flow rate to be metered. The injector is preferably made in such a way that it results in a narrowing of the section of the normal pipe diameter. By simultaneously creating an increased turbulent flow and a narrowing, a sharp fall in the static water pressure is locally produced. As a result of this, the ozone rich gas is sucked in and is immediately intimately mixed with the water flow. The injector is placed along the delivery side of the pump (4).

2. The Gas Contact System (2):

The purpose of the contact system is to allow the finely divided gas to dissolve in water. To that end, the dissolved gas, already present in the water—usually the result of, and therefore in equilibrium with, atmospheric air—is partially degassed. This process of aeration-de-aeration is dependent upon a large number of physical parameters (salt content, temperature, alkalinity, . . . ), but also upon the total and partial pressures of the gases concerned. In practice, it is possible to act upon only a few of these parameters in order to increase the solubility of ozone, namely the temperature, the total pressure and the partial pressures.

The temperature can be controlled by the use of intermediate tanks, which, in function of the flow capacity to be handled, can cause the water flow to cool down to the optimum value, which is a function of the solubility factor and breakdown of the ozone molecule and of the dissolved constituents which can crystallise at too low temperatures. The rule here is that the temperature should be as low as possible to assure proper functioning of the ozone, but on the other hand should remain sufficiently high in order to avoid precipitation caused by crystallisation. In practice, it is preferable to keep the temperature below 30° C., but the process can be carried out without any problem up to 40-45° C., albeit with reduced efficiency.

The total pressure of the system is maintained between 30 and 250 kPa, preferably between 50 to 150 kPa. The partial pressure of the ozone gas mixture is regulated during the production of ozone gas in the ozone generator. In the method according to the invention ozone concentrations between 3 and 16 wt.-% are preferably used.

The contact system consists of a system of pipes fitted in a compact manner (for example, a coil of pipes), which gives the water flow the correct physical characteristics to dissolve the gas in the best possible way. The Reynolds number of the flow preferably lies in the turbulent region, with values between 50,000 and 300,000.

3. The Phase Separator (3) or Reaction Vessel:

The phase separator has 4 functions:

a. The separation of the gas phase. This gas phase consists of gas which has been expelled from the water (predominantly nitrogen), and of added ozone-containing gases which are no longer soluble. In addition, part of the $CO_2$ formed in the reactions is also blown off. The gas blown off is approximately equal to the amount of ozone-containing gas injected by means of the injector.

b. Pressure regulation for the entire system of phase separator/contact system.

c. The creation of a retention time needed to allow the dissolved oxygen/ozone to do its work, in this case to react with the impurities in the water, before the water is again sent through the ozone injector and the gas contact system.

d. The phase separator also has a pH regulating effect. Blowing off the produced $CO_2$ prevents acidification of the water. Acidification is preferably avoided since it hampers the process, especially if the pH drops below 5.

4. The Circulating Pump (4):

The circulating pump is used to circulate the water in the contact system and the phase separator. The pump extracts the water from the phase separator and forces it into the contact system. The ozone injector (1) is placed at the inlet of the contact system. The circulating pump is preferably of the non-pulsating type and is preferably one of the rotary positive-displacement pump types.

III. DISCUSSION OF THE MULTI-STEP PURIFICATION TECHNIQUE

The water is treated with the oxygen/ozone gas in at least two steps, but generally in three steps. Contrary to what is generally assumed, this method permits a complete degradation of the organic constituents to obtain, inter alia, the elementary degradation products $CO_2$, $H_2O$, $NO_2$ and $NO_3$.

1st Step:

In the first step (carried out in the first section 1, 2, 3, 4 of the purification plant) the effluent (5) is treated for one hour with a high dose of ozone based on oxygen or air. The water is recirculated by means of a pump (4) in such a way that a moderately turbulent flow is created in the ozone/water contact system (2) and that there is a retention time of 5 to 15 seconds. Downstream of the pump, ozone is metered continuously in concentrations of 3 to 16 wt.-%, preferably 6 to 16 wt.-%. After the ozone-rich gas mixture is dissolved, the water flows into a phase separator (3), where the ozone reacted out in this step is separated from the water phase and the water saturated with ozone and oxygen undergoes a reaction time of 100 to 200 seconds before the cycle restarts.

A refreshment rate of 20 to 40 times per hour is applied.

The gas/water ratio is 10 to 25 (normal $m^3$ gas/$m^3$ water).

The pressure in the contact system and the phase separator is 30 to 250 kPa, preferably 50 to 150 kPa.

2nd Step:

After the treatment in the first step, the water is diluted 2 to 4 times with pure water (tap water), with purified water (6) or with effluent (7) of a different origin (preferably containing more readily degradable organic material), and the total volume is treated in the same way as in the first step (but this time in the second section 1', 2', 3', 4' of the purification plant).

The ozone containing gas which is used in this step is preferably produced starting from oxygen. The ozone concentrations vary between 6 and 16 wt.-%. The applied pressure comprises 30 to 150 kPa.

A refreshment rate of 20 to 40 times per hour is applied.

The gas/water ratio is 8 to 20 (normal $m^3$ gas/$m^3$ water).

3rd Step:

If after the treatment in the second step the concentration of the difficultly biodegradable or non-biodegradable organic compound or compounds has not yet dropped to below the detection limit and/or below the desired value, the water is again diluted 2 to 4 times with pure water (tap water), with purified water (6) or with effluent (8) of a different origin (preferably containing more readily degradable organic material). The total volume of effluent obtained is treated for two hours with a dose of ozone and oxygen (this being in the third section 1", 2", 3", 4" of the purification plant).

The ozone which is used in this step is preferably produced starting from oxygen.

The water is recirculated by means of a pump (4") in such a way that a moderately turbulent flow is created in the gas/water contact system (2") and that there is a retention time of 4 to 12 seconds. The various gas flows are added on the delivery side of the pump.

After the ozone/oxygen gas has been dissolved, the water passes into a phase separator (3"), where the gas which has been reacted out is separated from the water phase, and the water saturated with ozone and oxygen undergoes a reaction time of 200 to 500 seconds before the cycle begins again.

The pressure in the contact system and the phase separator is 30 to 150 kPa, preferably 50 to 150 kPa. The applied ozone containing gas has preferably an ozone concentration of 6 to 16 wt.-%.

A refreshment rate of 6 to 12 times per hour is applied.

The gas/water ratio is 4 to 10 (normal $m^3$ $gas^3$ water).

In the above exemplary description of the three steps an ozone treatment of one and two hours respectively is specified. It is clear that in practice tests will be needed to determine what minimum treatment duration in the various steps should be applied for a specific type of effluent and a specific purification plant in order to obtain the envisaged effects. The invention is therefore not limited to the above parameters given as examples.

IV. COMPARATIVE TESTS

1. Test Set-Up

In order to carry out the test, use was made of a test set-up which corresponds to the first part 1, 2, 3, 4 of the purification plant shown in FIG. 1. In order to dilute the water purified with ozone after a particular treatment step, some of the water was removed and replaced with diluent water. The diluted effluent was subsequently treated with ozone again in the same purification set-up.

Ozone injector: 150 grams per hour (ozone concentration 11.9% based on pure oxygen); gas/water ratio: approx. 10 normal $m^3$ gas/$m^3$ water.

The gas contact system: formed by a water hose 8 mg and with a diameter of 25 mm.

Water volume pipe system: 4 l

Retention time: 6 s

Working pressure: 60 to 70 kPa

Phase separator: Water volume vessel of 90 l

Retention time: 135 s

Working pressure: 60 to 70 kPa

Circulation pump: Output of 35 to 40 l/min

2. Carrying out the Tests

Test Sequence:

1. The vessel (3) of the test set-up is filled with a representative sample of 90 litres of the effluent to be treated.

2. Ozone generator is started up and circulating pump (4) is started up.

3. After 1 hour, the ozone generator is stopped, the circulating pump (4) is stopped and 60 litres are drained off in such a way that 30 litres remain in the vessel (3).

4. A quantity of 60 litres of the desired water (tap water or other lightly polluted effluent) is added to the vessel (3) of the test set-up, in order to dilute the water treated in the first step.

5. The ozone generator is started up and the circulating pump (4) is started up.

6. After 1 hour, ozone generator is stopped, circulating pump (4) is stopped and 60 litres are again drained off from the vessel (3).

7. A quantity of 60 litres of the desired diluent water (tap water or other lightly polluted effluent) is added to the vessel (3) of the test set-up.

8. The ozone generator is started up and the circulating pump (4) is started up.

9. After 2 hours, the experiment is stopped.

3. Test Results

A number of characteristics of the original effluent to be treated:

COD: 1,100 to 1,800 mg/l

HCN: 75 to 85 mg/l

Benzene: approx. 2,000 µg/l

The effluent corresponded to water, wherein the combustion gases, produced during the reticulation of polyurethane foams by means of the oxidation of hydrogen gas, were trapped. The effluent contained a large range of difficultly degradable organic compounds, such as benzene (2,650 µg/l), toluene (338 μg/l), ethyl benzene (8 μg/l), para-xylene and meta-xylene, (4.7 μg/l), styrene (143 μg/l) and o-xylene (4 μg/l) (MAH). It emerged from tests that with the method according to the invention, more particularly by use of the test sequence described above, the content of all these difficultly degradable organic compounds could be reduced to below the detection limit of 0.5 μg/l. Further tests with ground water containing vinyl chloride, dichloromethane, tr1,2-dichloroethylene, 1,1-dichloroethane, cis1,2-dichloroethylene, trichloromethane, 1,1,1-trichloroethane, tetrachloromethane, trichloroethylene, 1,1,2-trichloroethane, tetrachloroethylene, chlorobenzene, 1,3-dichlorobenzene, 1,4-dichlorobenzene and 1,2-dichlorobenzene (VOCl) showed that the content of these compounds could also be reduced to below the detection limit of 0.5 μg/l. Hereinafter there will be more particularly a discussion of the results obtained from measurement of the COD values and the HCN values after the treatment of effluent coming from the reticulation of polyurethane foam.

A total of 6 tests with the following specifications was carried out:

Test 1: no pH check, poor circulating pump (diaphragm pump), treatment of the effluent lasts 4 hours and comprises the continuous addition of ozone with existing ozone generator.

Test 2: no pH check, good circulating pump, treatment of the effluent lasts 8 hours and comprises the continuous addition of ozone with existing ozone generator.

Test 3: pH check by addition of NaOH (guide point pH 7 to 8), treatment of the effluent lasts 7 and 8 hours respectively and comprises the continuous addition of ozone with existing ozone generator.

Test 4: test was carried out according to the above test sequence, with the addition in step 4 of 60 litres of effluent with COD of 42 mg/l (light nitrogen and phosphorus pollution) and in step 7 of 60 litres of tap water.

Test 5: test was carried out according to the above test sequence, with the addition in step 4 of 60 litres of effluent with COD of 127 mg/l (chlorinated products such as vinyl chloride) and in step 7 of 60 litres of tap water.

Test 6: test was carried out according to the above test sequence, with the addition in step 4 of 60 litres of tap water and in step 7 of 60 litres of tap water.

The test results for COD and HCN are given below for the various tests. The percentages indicate the reduction relative to the original value, with the dilution effect being taken out by way of a back calculation.

Example: the COD value of the purified water after step 9 of the test sequence is 11 mg/l, but is "back calculated" to 99 mg/l (two dilutions 3 times, so in all diluted 9 times. The original COD was, for example, 1,183 mg/l, so that the COD drops from 100% to 9.29%.

TABLE 1

| | Evolution of the COD value | | | | | |
|---|---|---|---|---|---|---|
| | Test | | | | | |
| | 1 | 2 | 3 | 4 | 5 | 6 |
| Mixing | poor (diaphragm) | good | good | good | good | good |
| pH control | none | none | NaOH | | | |
| System according to invention | − | − | − | + | + | + |
| Tap water | | | | | step 7 | step 4 and 7 |
| Polluted ground water | | | | | step 4: COD 127 mg/l | |
| Effluent with readily degradable compounds | | | | step 4 COD 42 mg/l | | |
| 0 | 100.00% | 100.00% | 100.00% | 100.00% | 100.00% | 100.00% |
| 1 | 95.50% | 80.80% | 71.50% | 66.27% | 65.42% | 53.51% |
| 2 | 85.90% | 72.30% | 56.20% | 32.46% | 37.33% | 35.12% |
| 3 | 81.50% | 67.50% | 48.40% | 19.78% | 17.86% | 28.60% |
| 4 | 83.50% | 55.40% | 34.90% | 8.37% | 7.56% | 6.02% |
| 5 | | 43.00% | 20.90% | | | |
| 6 | | 29.06% | 15.12% | | | |
| 7 | | 21.06% | 10.00% | | | |
| 8 | | 19.09% | 7.30% | | | |

TABLE 2

Evolution of the HCN value

|  | Test | | | | | |
|---|---|---|---|---|---|---|
|  | 1 | 2 | 3 | 4 | 5 | 6 |
| Mixing | poor (diaphragm) | good | good | good | good | good |
| pH control | none | none | NaOH | | | |
| System according to invention | − | − | − | + | + | + |
| Tap water | | | | step 7 | step 7 | step 4 and 7 |
| Polluted ground water | | | | | step 4: COD 127 mg/l | |
| Effluent | | | | step 4 COD 42 mg/l | | |
| 0 | 100.00% | 100.00% | 100.00% | 100.00% | 100.00% | 100.00% |
| 1 | 68.70% | 7.20% | | 13.75% | 15.36% | 31.43% |
| 2 | 37.90% | 5.60% | 5.30% | 3.87% | 4.71% | 10.37% |
| 3 | 40.50% | 4.30% | 3.70% | 0.55% | 0.58% | 0.50% |
| 4 | 34.50% | 3.10% | 2.80% | 0.55% | 0.42% | 0.57% |
| 5 | | 3.60% | 1.90% | | | |
| 6 | | | 1.50% | | | |
| 7 | | | 1.30% | | | |
| 8 | | 3.60% | | | | |

Figure 2:
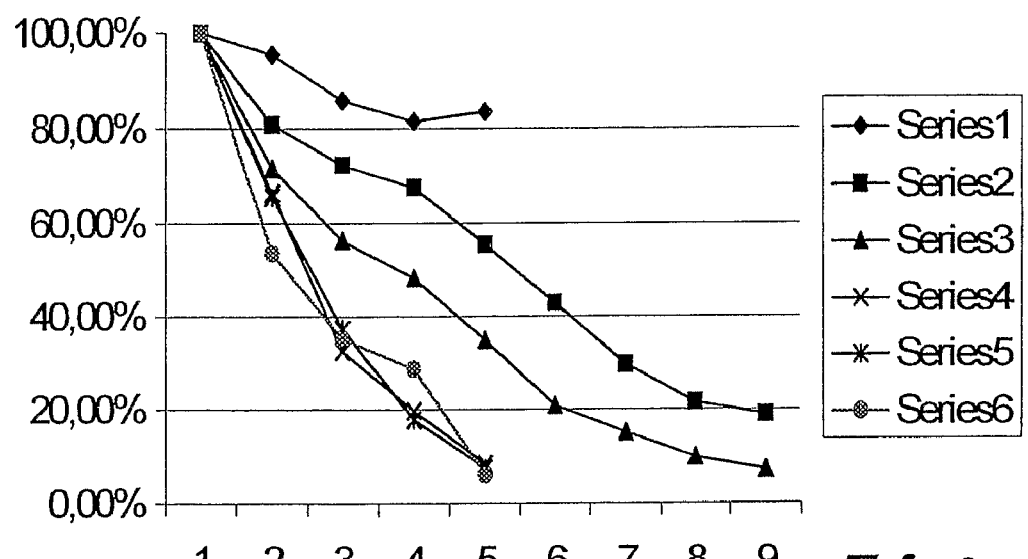
FIG. 2 shows test results for the evolution of the COD value.
Figure 3:
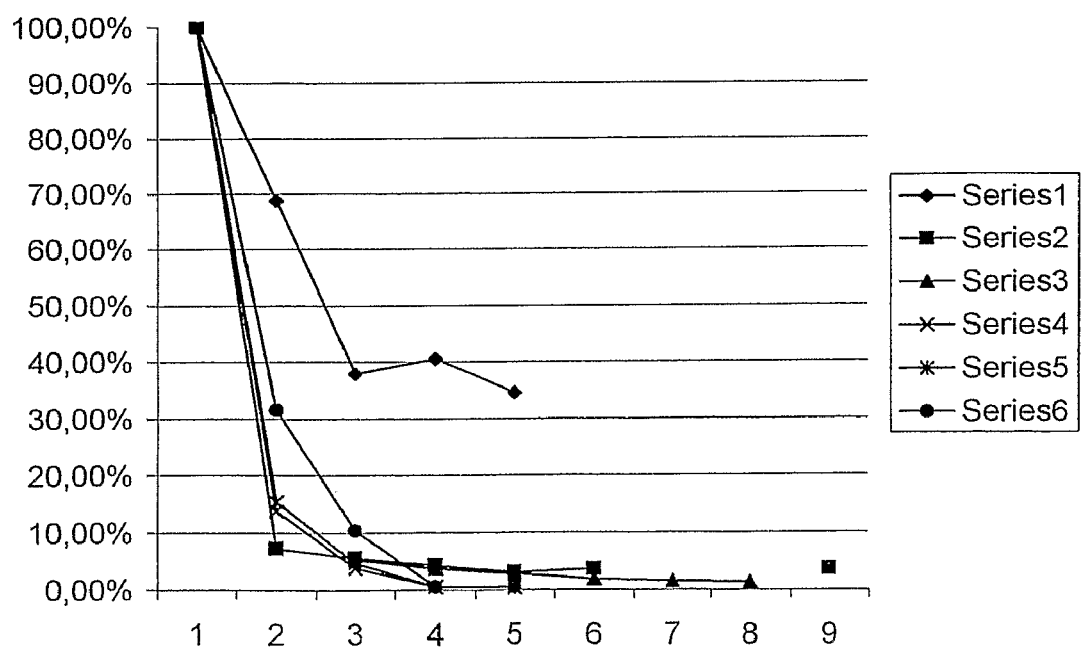
FIG. 3 shows test results for the evolution of the HCN value.

The results shown in Tables 1 and 2 are also shown in FIGS. 2 and 3 respectively. The results indicate that better results can be obtained with the method according to the invention and that no pH adjustment is necessary, so that no extra salt loading of the water occurs. A further advantage of the method according to the invention is that an effluent which is polluted with readily degradable compounds can also be purified by this method at the same time.

It will be clear from the invention that effluents of different origins can be purified, in particular also effluents originating from soil decontamination sites.

The invention claimed is:

1. A method to purify polluted water containing a first concentration of at least one difficultly biodegradable or non-biodegradable organic compound, in which method the above mentioned organic compound is oxidized by bringing the polluted water into contact with at least one ozone containing gas, characterized in that in a first treatment step part of the above mentioned organic compound present in the polluted water is oxidized by bringing said polluted water into contact with the above mentioned ozone containing gas in such a way that the first concentration of said organic compound is reduced to a second concentration, the entire amount of said organic compound present in the polluted water being reacted with ozone for a total of at least 20 minutes in said first treatment step, after the first treatment step the second concentration of said organic compound is reduced by dilution with an aqueous liquid to a third concentration which is at most two thirds of the second concentration, and in a second treatment step a further part of the above mentioned organic compound present in the polluted water is oxidized by bringing the diluted polluted water into contact with the above mentioned ozone containing gas in such a way that the third concentration of said organic compound is reduced to a fourth concentration, the entire amount of said organic compound present in the diluted polluted water being reacted with ozone for a total of at least 20 minutes in said second treatment step.

2. A method according to claim 1, characterized in that the second concentration of the above mentioned organic compound is reduced to a third concentration which is at least one tenth of the second concentration.

3. A method according to claim 1, characterized in that in the first and in the second treatment step the polluted water and the diluted polluted water respectively are brought into contact at least 10 times with the above mentioned ozone containing gas.

4. A method according to claim 1, characterized in that in the first treatment step a total of at least 10 normal cubic meters of the ozone containing gas per cubic meter of the polluted water is injected into the polluted water.

5. A method according to claim 1, characterized in that in the second treatment step a total of at least 8 normal cubic meters of the ozone containing gas per cubic meter of the diluted polluted water is injected into the diluted polluted water.

6. A method according to claim 1, characterized in that in both the first and the second treatment step the above mentioned organic compound is reacted with the ozone for a total of at least 30 minutes.

7. A method according to claim 1, characterized in that after the second treatment step the fourth concentration of the above mentioned organic compound is reduced by dilution with a further aqueous liquid to a fifth concentration which is at most two thirds of the fourth concentration, and in a third treatment step a yet further part of the above mentioned organic compound present in the polluted water is oxidized by bringing the further diluted polluted water into contact with the above mentioned ozone containing gas in such a way that the fifth concentration is reduced to a sixth concentration, the entire amount of said organic compound present in the further diluted polluted water being reacted with ozone for a total of at least 40 minutes in said second treatment step.

8. A method according to claim 7, characterized in that the fourth concentration of the above mentioned organic compound is reduced to a fifth concentration which is at least one tenth of the fourth concentration.

9. A method according to claim 7, characterized in that in the third treatment step per cubic meter of the further diluted polluted water a total of at least 4 normal cubic meters of the ozone containing gas is injected into the further diluted polluted water.

10. A method according to claim 7, characterized in that in the third treatment step the above mentioned organic compound is reacted with the ozone for a total of at least 60 minutes.

11. A method according to claim 1, characterized in that the above mentioned ozone containing gas contains at least 3 wt.-% of ozone.

12. A method according to claim 11, characterized in that the above mentioned ozone containing gas is prepared starting from an oxygen rich gas containing at least 80% of oxygen.

13. A method according to claim 1, characterized in that the above mentioned organic compound is oxidized at a pressure of at least 30 kPa.

14. A method according to claim 7, characterized in that a water further purified with ozone in a further treatment step is used as the above mentioned aqueous liquid and/or as the above mentioned further aqueous liquid for dilution of the water after a predetermined treatment step.

15. A method according to claim 1, characterized in that the above mentioned polluted water contains combustion gases.

16. A method according to claim 1, wherein said third concentration is at most half of said second concentration.

17. A method according to claim 2, wherein said third concentration is at least one fifth of said second concentration.

18. A method according to claim 3, wherein in the second treatment step the polluted water and the diluted polluted water respectively are brought into contact at least 15 times with the above mentioned ozone containing gas.

19. A method according to claim 18, wherein in the second treatment step the polluted water and the diluted polluted water respectively are brought into contact at least 20 times with the above mentioned ozone containing gas.

20. A method according to claim 6, wherein in both the first and the second treatment step the above mentioned organic compound is reacted with the ozone for a total of at least 40 minutes.

21. A method according to claim 7, wherein said fifth concentration is at most half of said fourth concentration.

22. A method according to claim 8, wherein said fifth concentration is at least one fifth of said fourth concentration.

23. A method according to claim 10, characterized in that in the third treatment step the above mentioned organic compound is reacted with the ozone for a total of at least 90 minutes.

24. A method according to claim 11, characterized in that the above mentioned ozone containing gas contains at least 8 wt.-% of ozone.

25. A method according to claim 15, characterized in that said combustion gases are obtained from the reticulation of polyurethane foams by means of the oxidation of hydrogen gas.

* * * * *